Dec. 7, 1965  L. O. UPTON  3,222,152
SOLDER SEALING GLASS MEMBERS
Filed Nov. 22, 1960
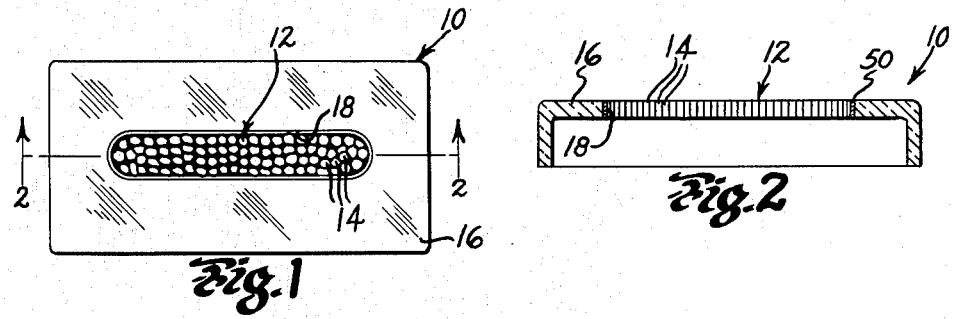
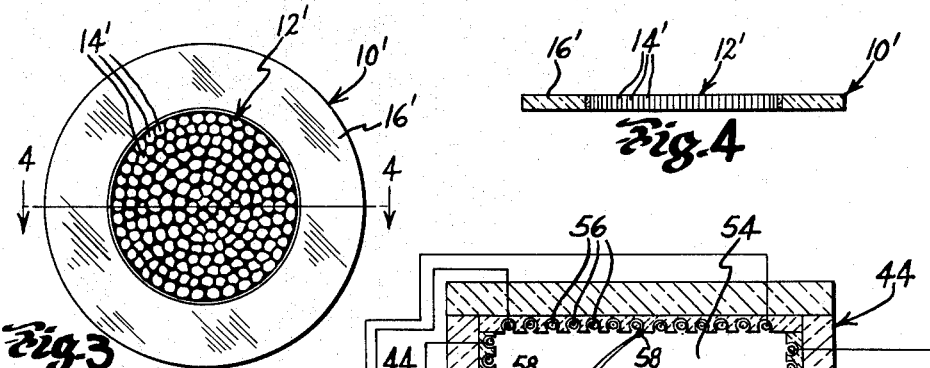
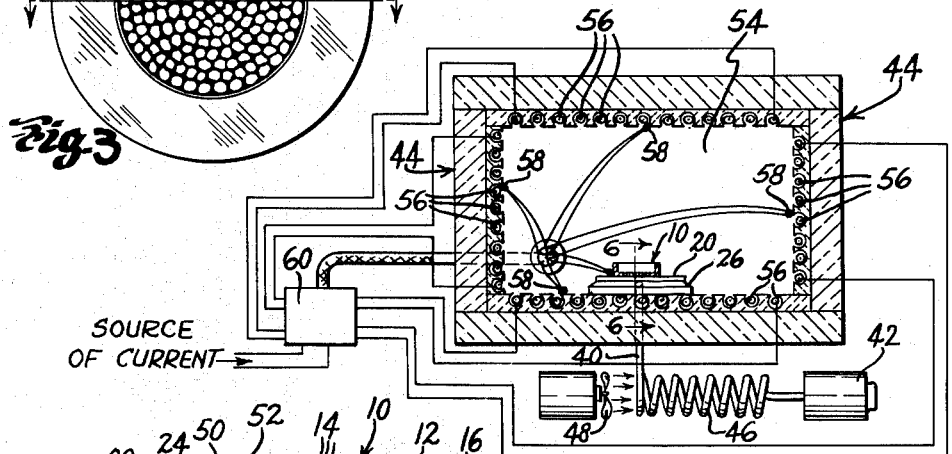
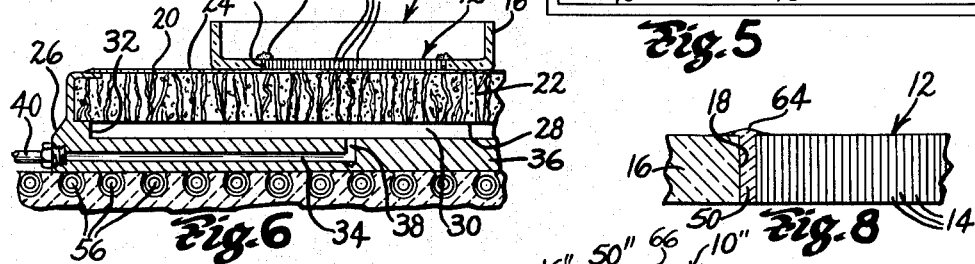
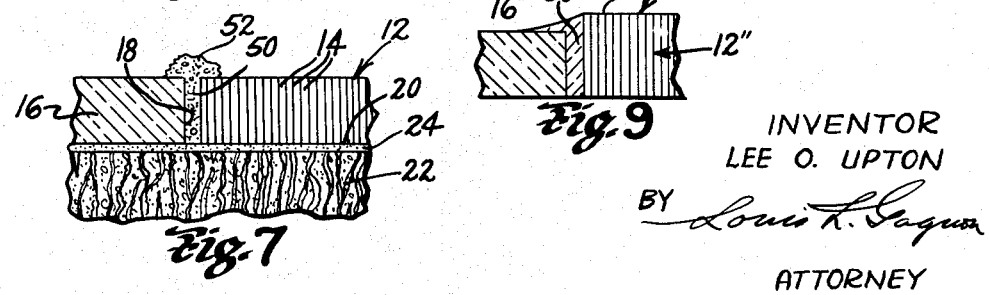
INVENTOR
LEE O. UPTON
BY
ATTORNEY

United States Patent Office 3,222,152
Patented Dec. 7, 1965

3,222,152
SOLDER SEALING GLASS MEMBERS
Lee O. Upton, Sturbridge, Mass., assignor to American Optical Company, Southbridge, Mass., a Voluntary Association of Massachusetts
Filed Nov. 22, 1960, Ser. No. 71,084
3 Claims. (Cl. 65—32)

This invention relates to improvements in fiber type energy transferring devices and has particular reference to an improved plate-like structure embodying, in part, an assembly of fiber-like energy conducting elements and method and apparatus for making the same.

Cathode ray tubes or other similar vacuumized or pressurized articles having face plates for transferring light or other forms of energy inwardly or outwardly of the particular article in accordance with its intended function usually comprise a two-part glass assembly consisting of a glass envelope in which the electrical components of the device are contained and a face section or plate which is hermetically edge sealed by fusion to one end of the glass envelope.

Face plates of the type embodying a plurality of individually light-insulated all glass fibers or other types of fibers embodying glass outer claddings which are joined and hermetically sealed together in side-by-side relation with each other have proven to be superior to conventional solid glass envelop faces when used as energy-transmitting means in articles such as cathode ray tubes or the like. However, previous to this invention, the use of fiber type face plates in cathode ray tube assemblies has rendered the assembly processes generally more complicated, difficult to perform and costly. With regard to fabrication problems, it has been relatively difficult to produce a hermetically sealed joinder between a tube envelope and the fibers of a fiber type face plate without causing a fracturing of the portion of the envelope to which the fiber plate is attached and/or distortion and fracturing in the fiber structure itself.

The problems encountered in heat joining fiber-type face plates to the face portions of vacuum tube glass envelopes or the like which relate to distortion of the individual fibers are primarily a result of the relatively high fusing temperature required heretofor and strain and stresses which are set up in bringing about fusion of the respective parts.

In prior practices, it has been necessary to provide a relatively close fit between the fiber face plate and the portion of the tube envelope to which it is to be attached in order to form an effective joinder therebetween. Fitting one glass part within another is always a time-consuming and costly operation particularly where close tolerances are required. Moreover, heat joining closely fitted glass articles inherently leads to strain difficulties which tend to distort and/or cause fracturing of one or the other or both of the parts. Also, since fibers of the glass clad type are, in general, formed of two or more different glasses or materials having somewhat different softening temperatures, the particular temperature which is required to bring about fusion of one part of the fibers to a receiving member such as the face section of a cathode ray tube envelope or the like are such as to develop serious distortions in other parts of the fibers with the net result of an inferior product. Also, the temperatures required heretofor in making fused fiber type face plates have, in general, been such as to render all of the materials of the fiber structure easily distortable.

It will become apparent from the following disclosure that the present invention overcomes the above-mentioned and other obvious shortcomings of conventional practices in this field.

Accordingly, it is a principal object of this invention to provide an improved substantially strain-free and distortionless plate-like structure embodying a fused assembly of fiber elements surrounded by a solid glass supporting member with said assembly of fiber elements being in hermetically sealed connected relation with said supporting member by a fused glass joinder and novel method and apparatus for making the same.

Another object is to provide novel means and method for glass fusing a fiber plate-like member to a one piece glass supporting member encompassing the same through the use of temperatures below that which normally tend to permit or produce distortion of said members.

Another object is to accomplish the above through the use of a solder glass material so characterized as to be of relatively low viscosity at temperatures required for its fusion to the parts of the fiber plate-like member while the materials of said member at said same fusing temperatures will be of relatively high viscosity.

Another object is to provide novel means and method for joining together initially loosely fitted fiber and solid glass members of the above character with a filler of relatively low melting solder glass which is highly elastic in nature and in such manner as to form a hermetic seal at the joinder between said members without causing distortion or damage to the component parts of the resultant assembly.

Another object is to provide a technique for forming the joinder between the initially loosely fitted parts of an assembly of the above character wherein solder glass is placed between said parts initially in granulated form and, through the use of novel means for supporting and bringing about fusion of its parts, air and gases are continuously withdrawn from said solder glass to form a clean, secure and hermetically sealed joinder between said parts.

A further object is to provide simple, efficient and economical means and method for fabricating articles of the above-mentioned character.

Other objects and advantages of the invention will become apparent from the following description when taken in conjunction with the accompanying drawings in which:

FIG. 1 is a front elevational view of one type of fiber face plate construction which is formed in accordance with the invention;

FIG. 2 is a cross-sectional view taken on line 2—2 of FIG. 1 looking in the direction indicated by the arrows;

FIG. 3 is a front elevational view of an alternate type face plate construction which is formed in accordance with the invention;

FIG. 4 is a cross-sectional view taken on line 2—2 looking in the direction indicated by the arrows;

FIG. 5 is a diagrammatic illustration partially in cross-section of apparatus which is used in carrying out the method of the invention;

FIG. 6 is an enlarged fragmentary cross-sectional view taken on line 6—6 of FIG. 5 looking in the direction of the arrows;

FIG. 7 is a still further enlarged fragmentary cross-sectional view of the face plate structure of the invention showing details of the adjoining area between the parts thereof as having the above-mentioned granulated solder glass placed therein in preparation for the subsequent step of fusing said parts together with said solder glass;

FIG. 8 is a view similar to FIG. 7 illustrating the result of carrying out the step of fusing together the parts of said face plate; and FIG. 9 is a view similar to FIG. 8 illustrating a modified face plate construction.

Referring more particularly to the drawings wherein like characters of reference designate like parts throughout the several views, it will be seen that the face plates 10 (FIG. 1) and 10' (FIG. 2) each embody a two-part, fused together structure. The face plate 10 embodies an assembly 12 of energy-transmitting fiber-like elements 14 and an outer surrounding solid glass supporting part 16. The face plate 10' embodies a similar arrangement of parts 12', 14' and 16' and both of said face plates 10 and 10' are intended to be edge fused or otherwise attached to a cathode ray tube or some similar form of energy producing or receiving equipment. It is pointed out, however, that while the disclosure makes reference to the face plate structures 10 and 10' as being for use with cathode ray or other similar types of tubes, they are in no way limited to such use. That is, the articles 10 or 10' which have been referred to as face plates may be used as energy-transmitting components in optical systems wherein the parts 16 or 16' thereof would be used as means for supporting and mounting the fiber sections 12 or 12' in a desired aligned relationship with other components in the optical system.

It will become apparent that the face plates 10 and 10' are each fabricated in an identical manner and, other than being of different contour shapes, they are substantially identical. Therefore, the process involving the fabrication of the face plate 10 will be described in detail hereinafter, it being understood that the face plate 10' is formed in a similar manner.

In both of the face plates 10 and 10' the fiber-like elements 14 and 14' respectively, in one form, might each embody a core structure formed of optical glass with an outer relatively thin coating or cladding of glass which is intended primarily to function as light-insulating means as will be explained shortly. In another form, the fiber-like elements might each embody a metallic core section adapted to receive and conduct electrical energy and having a relatively thin electrical insulating glass outer cladding therearound by means of which the latter type of fiber elements may be connected together by fusion in the form of a vacuum tight integral assembly such as shown at 12 or 12' (FIGS. 1–3).

The former case relating to the all-glass fibers will be set forth herein by way of example in the following description of the process of the invention.

The fiber-like elements 14 in this case, being of the well-known clad or individually light-insulated type, would preferably embody a core part of material such as glass of the optical flint type or the like having a relatively high index of refraction surrounded by a relatively thin cladding of crown type glass or the like having an index or refraction lower than that of said core glass. In the usual manner of fabricating such fiber elements, materials which are to comprise the core and cladding parts thereof are selected to have indices of refraction of such relative values as to provide the ultimate fiber elements 14 each with a maximum light-aperture or acceptance angle within which light entering one end thereof will be substantially totally internally reflected adjacent the interface between the said core and cladding parts and thereby transferred through the elements from end-to-end with a minimum loss in intensity. In this way, the cladding part functions to light-insulate one adjacent fiber element 14 of the assembly 10 from another adjacent fiber element thereof so as to substantially obviate the effects of "cross-talk" (the passing of light from one fiber element to another). As it is well known in the field of fiber optics, "cross-talk" is extremely detrimental particularly in instances where a structure formed of many optical fibers is intended for use as means to receive and transfer optical images from one location to another by conducting adjacent elements of an image each through a particular fiber. "Cross-talk" intermixes these image elements and thereby deteriorates the overall transferred image.

The face plate 10 of the invention is intended for use as means for transferring optical images with high definition. However, it may be employed in the construction of devices which are used simply to conduct non-image forming light from one location to another or, as stated above, if formed of elements having metallic core parts, it would be used to transfer electrical energy.

A typical fiber element 14 construction suitable for use in the fabrication of the face plate 10 of the invention might embody, for example, a core part of optical flint glass having an index of refraction of approximately 1.62 with a cladding of crown type or similarly characterized glass having an index of refraction of approximately 1.52. A suitable cladding thickness might be in the neighborhood of one-tenth the overall diameter of the fiber itself and the overall fiber diameter might range from a fraction of a thousandth of an inch to several thousandths of an inch. The selection of fiber element sizes would be made in accordance with the degree of image resolving power desired of the fused assembly 12 of fiber elements. Reasonably good image resolution has been achieved with fiber elements each having a cross-sectional diameter of approximately .003 inch. However, fiber elements having a diametrical size as small as to approach 5 to 10 microns might be used for special applications. Such fiber elements 12 may be formed by placing a relatively large rod of the higher index glass within a relatively close fitting tube of the lower index glass with said rod and tube each having a thickness proportionate to that desired of the respective core and cladding parts of the finally formed fiber elements 14. The rod and tube assembly is heated and drawn down to the ultimate size desired to form the fiber elements 14.

In the fiber assembly 12, the fiber-like elements are fused together in hermetically sealed side-by-side relation with each other and the resultant bundle or fiber assembly 12 which will be referred to hereinafter as the fiber part 12 of the face plate 10 is shaped by cutting or grinding to a desired size and contour shape such as shown in FIG. 1, for example.

In accordance with one aspect of the invention, the fiber part 12 is formed to a thickness approximately equal to that of the supporting part 16 while it may be of a thickness greater than that of its supporting part as shown in FIG. 9 which will be described in detail hereinafter. It should also be understood that, if it is so desired, the fiber part 12 may be formed to a thinner front-to-back dimension than that of the part 16.

Referring more particularly to the structure of FIGS. 1 and 2 wherein the fiber part 12 is of a front-to-back thickness substantially equal to that of the supporting part 16, the part 16 is provided with an opening 18 therethrough (see more particularly FIGS. 1, 2 and 7) having a shape substantially identical to the peripheral contour of the fiber part 12, but of a size somewhat larger than that of the fiber part 12 so as to provide a loose fit between the part 16 and the part 12. A fit such as to allow a peripheral spacing of 1/64 to 1/16 of an inch about the fiber part 12 when placed centrally or coaxially within the opening 18 has been found to be suitable in most instances. These dimensions, however, may be altered to suit any particular need.

With the fiber part 12 and the supporting part 16 prepared as mentioned above, the assembly thereof is made upon the flat surface 20 of a permeable block 22 as shown in FIGS. 5–7. The block 22 is formed of refractory material and is preferably provided with a very thin coating of material 24 also of a permeable nature and which will function as a parting agent to prevent sticking of the solder glass of the face plate 10 during the subsequent fusing together of its two parts 12 and 16. The material 24, which will be referred to hereinafter as the parting agent 24, might, for example, consist of china clay or china clay mixed with sodium silicate and be of a thickness such as, for example, of only a few microns.

The block 22 is supported in a holder 26 preferably of the type shown in FIGS. 5 and 6 in such manner as to have the major portion of its under surface 28 suspended over a spacing 30 formed by the recessed portion 32 in the block holder 26. An opening 34 is provided so as to extend horizontally into the base section 36 and then vertically at 38 into communication with the spacing 30 and a suction line 40 is attached to the opening 34 at the outer side of the block holder 26 through which air and gases may be withdrawn from the opening 30 so as to produce a suction or vacuum-like effect which will pull air and gases through the permeable block 22 and the layer of the parting agent 24. Suction in the line 40 is produced by means of a suitable conventional suction pump illustrated diagrammatically as 42 in FIG. 5. Since the atmosphere which is drawn through the block (which is located in the furnace 44 during the fusing operation) is heated and might adversely affect the operation of the pump 42, the line 40 is coiled at 46 to dissipate at least some of the heat carried through the line and a motor-driven fan 48 is provided to assist in the cooling of the atmosphere passing through the coil 46.

Referring now to the glass parts 12 and 16, their assembly is made upon the block 22 as shown best in FIG. 6 with one of their sides resting against the parting agent 24 and with the peripheral spacing between the fiber part 12 and the inner side walls of the opening 18 substantially uniform at all points about the fiber part 12. The said spacing is then completely filled with granulated silicate solder glass 50 (see FIGS. 6 and 7) that contains a high percentage of lead oxide and which is so characterized as to be elastic by nature and absorptive to stresses and strains which might result from existing differences in expansion characteristics of the two glass parts 12 and 16 of the face plate 10 which are to be joined thereby. A silicate glass having a softening temperature of approximately 850° F. and containing approximately 70% lead oxide would be suitable. However, solder glasses having melting temperatures ranging from 700° F. to 1000° F. and containing from 85% to 50% lead oxide may be used. Solder glasses of this type such as Corning 7570 are commonly known to the trade and are readily available commercially. It is pointed out that the selection of solder glass 50 would be made in accordance with the selection of glasses used in the parts 12 and 16 of the face plate 10 so that said solder glass will have a melting temperature of approximately 25° F. to 50° F. below that of the glass of said parts 12 and 16 having the lowest softening temperature.

Because of the initial granulated state of the solder glass 50 which is placed loosely in the spacing between the face plate parts 12 and 16, it will, in filling said space, be of a porous nature and contain air between its particles which is to be withdrawn during the fusing operation as will be described shortly. By withdrawing the air from the granulated glass 50 as it becomes softened, there will be considerable shrinkage in the comparative volumes of said glass in its granulated state as compared with its final integrated or molten state and for this reason, an excess of said granulated glass over and above that required to initially fill the spacing between the parts 12 and 16 is piled up as shown by reference numeral 52 in FIGS. 6 and 7.

With the assembly of the face plate parts and the granulated glass made upon the block 22 which is within the heating chamber 54 of the furnace 44, heat is applied thereto in an amount sufficient to render said solder glass wettable and fusable to the adjacent parts 12 and 16 of the face plate 10 assembly as follows:

The furnace 44 is provided with top, bottom and side electrical heating elements 56 preferably individually controlled or operated in pairs through a conventional heat control device 60 which functions to increase or decrease the heat in the elements 56. Heat sensing thermocouples or the like 58 adjacent the elements 56 are operatively coupled to the control device 60 to provide an indication of the temperature produced by their respective adjacent elements and one of said thermocouples is positioned adjacent the face plate assembly to give an indication of its temperature. The heat control device 60 and heating elements 56 are conventional and are arranged and operated to produce a desired controlled uniform heat throughout the area of joinder between the face plate parts 12 and 16.

The fusion of the face plate parts is accomplished by applying gradually increasing controlled heat thereto by operation of the heating elements 56.

Simultaneously with the application of gradually increasing heat to the face plate assembly, the suction pump 42 is actuated to suck air and gases from the initially granulated solder glass through the permeable block 22.

In order to obtain a fused joinder of solder glass with a minimum of air or gas bubbles, the suction pump is preferably started when the face plate structure reaches a temperature of approximately 900° F. Suction is continued throughout the fusing operation with a force of from 15 to 20 inches of water.

When the face plate parts 12 and 16 reach a temperature of approximately 1050° F. for glasses of the above-mentioned character or within the range of from 700° F. to 1100° F., fusion will be completed. The temperature is then gradually lowered to approximately 825° F. where it is held for a period of approximately 2 hours or from 2 to 10 hours, whatever time is required, to fully anneal the glasses of the part 16 and cladding glasses of the fiber elements 14 which are initially chosen to be substantially identical in character.

After the above annealing period, the temperature in the furnace, adjacent the face plate assembly, is dropped to approximately 690° F. or to within a range of from 500° F. to 750° F. and held there for approximately two hours or from 2 hours to 10 hours, whatever time is required, to fully anneal the solder glass 50 and core glass of the fiber elements 14.

Following the two annealing periods, the temperature in the furnace is lowered to completely cool the resultant fused structure which, at this time has a hermetically sealed fused joinder between its parts formed of the solder glass 50 as shown in FIG. 8. The action of the suction through the block 22 withdraws air and gases from the solder glass 50 to render it ultimately substantially bubble-free.

One or the other or both of the surfaces of the fused face plate 10 may be ground and polished to remove any excess of solder glass such as shown at 64 (FIG. 8) if desired and to provide the same with a surface texture suitable for its intended purpose.

It is pointed out that by the use of the elastic solder glass, which provides a stress gradient between the face plate parts 12 and 16, fracturing of the face plate parts 12 and 16 is avoided and furthermore due to the low melting temperature of the solder glass substantially no distortion of the glasses of either the fiber elements 14 or part 16 of the face plate 10 will take place. These glasses of the parts 12 and 16 have softening points or points where distortion might readily occur at temperatures greater than the maximum fusing temperature given above.

In FIG. 9, there is shown a modification of the invention wherein the fiber optical part 12″ of the face plate 10″ is of a thickness greater than that of the surrounding part 16″. The glass solder joint 50′ is formed in a manner substantially identical to that described hereinabove. A structure such as shown in FIG. 9 allows the grinding and polishing or finishing of the surface 66 thereof without engaging the part 16″ of the face plate.

It will be seen from the foregoing that simple, efficient and economical means and method have been provided for accomplishing all of the objects and advantages of the invention as expressed in the accompanying claims and the invention is not to be limited to the exact matters shown and described as only the preferred matters have been given by way of illustration.

Having described my invention, I claim:

1. The method of connecting a surface of one glass member to a surface of another glass member comprising the steps of positioning said members so as to dispose said surfaces in adjacent spaced relationship with each other, placing a granulated solder glass in the space between said surfaces of said members, said solder glass being fusible to said members at a temperature lower than the softening temperature of the glasses of said members, heating the combination of said members and solder glass to a temperature below the softening temperature of said members but sufficiently to fuse said solder glass to said surfaces of said members and maintaining a vacuum at one side of said members relative to the other whereby air and gases are withdrawn from said solder glass and said solder glass is compacted into said space and said members are hermetically sealed one to the other.

2. The method of connecting a surface of one glass member to a surface of another glass member comprising the steps of positioning said members so as to dispose said surfaces thereof in adjacent spaced relationship with each other, placing a granulated solder glass in the space between said surfaces of said members, there being undesired air and gases between granules of said solder glass tending to produce porosities between said members when said solder glass is heated for fusion to said members, said solder glass being fusible to the glass of said members at a temperature substantially lower than the softening temperature of the glasses of said members, heating the combination of said members and solder glass to a temperature below the softening temperature of said members but sufficiently to fuse said solder glass to said members and continuously evacuating said air and gases from the material of said solder glass during heating and fusing thereof to render said solder glass and the fused connection thereof to said surfaces hermetically sealed.

3. The method of hermetically joining together inner and outer edges respectively of a rim member of glass and an energy-conducting member formed of a number of individually glass clad energy-conducting fibers fused together in side-by-side relationship, said inner edge of said rim member being of greater peripheral dimension than said outer edge of said energy-conducting member, positioning said energy-conducting member approximately centrally within said rim member with respective edges of said members disposed in spaced relationship with each other, placing a granulated solder glass in the space between said members, there being undesired air and gases between granules of said solder glass tending to produce porosities between said members when said solder glass is heated for fusion to said members, heating the combination of said solder glass and members to a temperature sufficient to fuse said granules of said solder glass together and to said members and simultaneously evacuating the major portion of said undesired air and gases to render said solder glass and the fused connection thereof to said members hermetically sealed.

References Cited by the Examiner

UNITED STATES PATENTS

| | | | |
|---|---|---|---|
| 2,207,158 | 7/1940 | Neville et al. | 161—176 |
| 2,347,614 | 4/1944 | Rudolph | 65—47 |
| 2,437,265 | 3/1948 | Manning | 161—176 |
| 2,461,841 | 2/1949 | Nordberg | 65—4 |
| 2,482,071 | 9/1949 | Simison | 65—4 |
| 2,642,633 | 6/1953 | Dalton | 65—43 X |
| 2,749,579 | 6/1956 | Shaw | 65—43 X |
| 2,752,731 | 7/1956 | Altosaar. | |
| 2,799,123 | 7/1957 | Van Steenis | 65—47 |
| 2,992,516 | 7/1961 | Norton | 65—3 |
| 2,992,586 | 7/1961 | Upton | 65—31 |
| 2,992,956 | 7/1961 | Bazinet | 156—73 |
| 2,996,634 | 8/1961 | Woodcock. | |
| 3,004,368 | 10/1961 | Hicks | 325—492 |
| 3,121,628 | 2/1964 | Loehrke | 65—18 |

DONALL H. SYLVESTER, *Primary Examiner.*

ARTHUR P. KENT, EARL M. BERGERT, WILLIAM B. KNIGHT, *Examiners.*